UNITED STATES PATENT OFFICE.

ALFRED PARAF, OF MULHOUSE, FRANCE.

IMPROVEMENT IN DYEING AND PRINTING TEXTILE FABRICS, AND IN COMPOUNDS THEREFOR.

Specification forming part of Letters Patent No. 63,084, dated March 19, 1867.

*To all whom it may concern:*

Be it known that I, ALFRED PARAF, of Mulhouse, in the Empire of France, have invented certain Improvements in Dyeing and Printing Textile Fabrics or Yarns, of which the following is a specification:

My invention consists of a new arsenical compound, possessing the property, when used in conjunction with other substances, of fixing aniline colors at a much less expense than by the means now in ordinary use; also in the use, in the process of dyeing or printing textile fabrics, of the acetate of alumina, acetate of magnesia, or the acetate of any other metallic oxide which will form an insoluble compound with arsenious acid, and not injure coal-tar color, in conjunction or combination with the above-named arsenical compound. It is already known that arsenious acid is very useful in dyeing and printing textile fabrics, especially when combined with alumina or magnesia for fixing aniline colors; but in consequence of its insolubility it has hitherto been but little used. I have discovered that arsenious acid, when heated with glycerine, loses this common characteristic of arsenious acid, and acquires quite different properties; that it forms an arsenious ether of glycerine, which possesses a neutral reaction. Pure glycerine dissolves its own weight of arsenious acid, the mixture being heated for about a quarter of an hour, until the decomposition of the glycerine begins, and the acroleine begins to get free. A larger proportion of glycerine may be used than that above indicated. The arsenious ether of glycerine thus formed is the new arsenical compound of which the first part of my invention consists.

To render this of use in the operation of dyeing and printing textile fabrics, I make a solution, as follows:

*Prepared color, No. 1.*—One pound of white arsenic, two pounds of glycerine. Boil for about a quarter of an hour, when the arsenious ether of glycerine begins to form, and add one-quarter of a pound of any crystallized coal-tar color.

I also make, by the following formula, a

*Color for printing, No. 2.*—Three hundred and fifty parts of water, two hundred and fifty parts of acetate of alumina, fifty parts of acetic acid, one hundred and fifty parts of white starch, or its equivalent in gum, according to the kind of goods on which it is to be printed. Boil, and when cold add two hundred parts of "prepared color," as above.

For reducing, I make a "thickening," as follows:

*Thickening for reducing, No. 3.*—Six hundred and fifty parts of water, one hundred and fifty parts of starch or gum, one hundred and fifty parts of acetate of alumina, fifty parts of acetic acid. Boil, and then cool. The acetate of alumina which I use is a common red liquor, made of a mixture of sulphate of alumina and acetate of lime, and it must stand at 20° T.

To the thickening may be added a quantity of my solution of coal-tar color, in arsenite of glycerine, (solution No. 1.)

In using the above mixtures I proceed as follows: I first print the fabric in the ordinary manner, using the mixtures Nos. 2 and 3; then "age" a few hours, until all the acetic acid which has been introduced into the color, in order to keep it perfectly soluble before printing, is set free. After aging, I "steam" the fabrics under pressure, as is usually done in calico-printing. By this steaming process the arsenite of glycerine is decomposed, forming glycerine and arsenious acid. The arsenious acid, in getting free, combines with the alumina, magnesia, (or other metallic base which is set free by the decomposition of the acetate, and they together form an insoluble arsenite, which has the property of fixing, by its formation, the coloring matter in the fabric or yarn. After steaming, it is only necessary to wash or soap. In aging and steaming, I recommend that the goods, after printing, be hung up in a room, warm or not, till all the odor of acetic acid has disappeared from them; then steam them one-half an hour, when they will be ready for washing or soaping.

The principal advantages of my invention are, first, the saving of the alcohol, which is usually used, in order to dissolve the coal-tar coloring matters; second, the saving of the alumina, which is usually used as a thickening, in order to "fix" the coloring matter; and, third, the production of "fast" aniline colors previously unknown.

Having thus fully described my invention, I claim—

1. As a new article of manufacture, the arsenite of glycerine hereinabove described.

2. The combination, in the operation of dyeing or printing on textile fabrics or yarns, of the arsenite of glycerine, coal-tar color, and acetate of alumina, magnesia, or other metallic oxide, substantially as and for the purpose hereinabove set forth.

ALFRED PARAF.

Witnesses:
 THOS. P. HOW,
 R. H. SEATON.